(12) United States Patent
Miller

(10) Patent No.: US 9,451,739 B2
(45) Date of Patent: Sep. 27, 2016

(54) AGRICULTURAL UNDERCUT IMPLEMENTS AND METHODS

(71) Applicant: Dustin Miller, McMinniville, OR (US)

(72) Inventor: Dustin Miller, McMinniville, OR (US)

( * ) Notice: Subject to any disclaimer, the term of this patent is extended or adjusted under 35 U.S.C. 154(b) by 20 days.

(21) Appl. No.: 13/895,875

(22) Filed: May 16, 2013

(65) Prior Publication Data

US 2014/0338932 A1    Nov. 20, 2014

(51) Int. Cl.
*A01B 39/04*    (2006.01)
*A01B 63/111*   (2006.01)
*A01B 77/00*    (2006.01)
*A01B 39/00*    (2006.01)

(52) U.S. Cl.
CPC .............. *A01B 77/00* (2013.01); *A01B 39/00* (2013.01)

(58) Field of Classification Search
CPC .. A01B 39/04; A01B 63/002; A01B 63/111; A01B 45/04
USPC ........................................ 172/19, 20, 29, 31
See application file for complete search history.

(56) References Cited

U.S. PATENT DOCUMENTS

| | | | | |
|---|---|---|---|---|
| 270,994 A | * | 1/1883 | Springer | 172/31 |
| 471,231 A | * | 3/1892 | Bentley | 172/19 |
| 2,164,246 A | * | 6/1939 | Kirkpatrick | 172/20 |
| 3,410,350 A | * | 11/1968 | Ware | 172/32 |
| 4,294,316 A | * | 10/1981 | Hedley et al. | 172/20 |
| 4,621,696 A | * | 11/1986 | Brouwer | 172/20 |
| 4,632,192 A | * | 12/1986 | Hooks | 172/19 |
| 5,129,462 A | * | 7/1992 | Mail | 172/19 |
| 5,272,949 A | * | 12/1993 | Holmes | 83/870 |
| 6,681,864 B2 | * | 1/2004 | Tvetene et al. | 172/20 |

\* cited by examiner

*Primary Examiner* — Gary Hartmann
(74) *Attorney, Agent, or Firm* — Mohr Intellectual Property Law Solutions, PC

(57) ABSTRACT

An agricultural undercut implement includes a frame carrying ground-engaging rolling means, a cutting disk arrangement to cut parallel slits in the ground soil, and an undercut assembly having upright cutting edges each aligned to follow a slit, and a transverse blade with a horizontal cutting edge disposed to undercut the ground soil between slits, as the frame rolls over the ground, such as when towed behind a tractor. The transverse blade is configured to sever the strip of ground soil undercut by the cutting edge, and then move the undercut soil strip up and over the blade before replacing it intact on the ground. A method of agricultural crop management includes non-terminatingly retarding the growth of a permanent cover crop by using the implement to undercut and replace intact the ground soil beneath the cover crop. Some examples include drive units configured to drive blades through pluralities of blade positions.

17 Claims, 9 Drawing Sheets

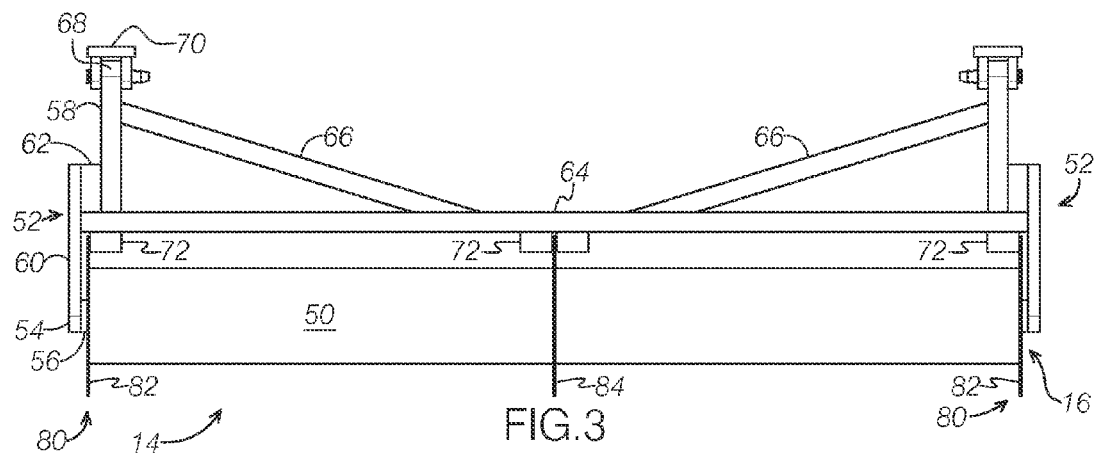
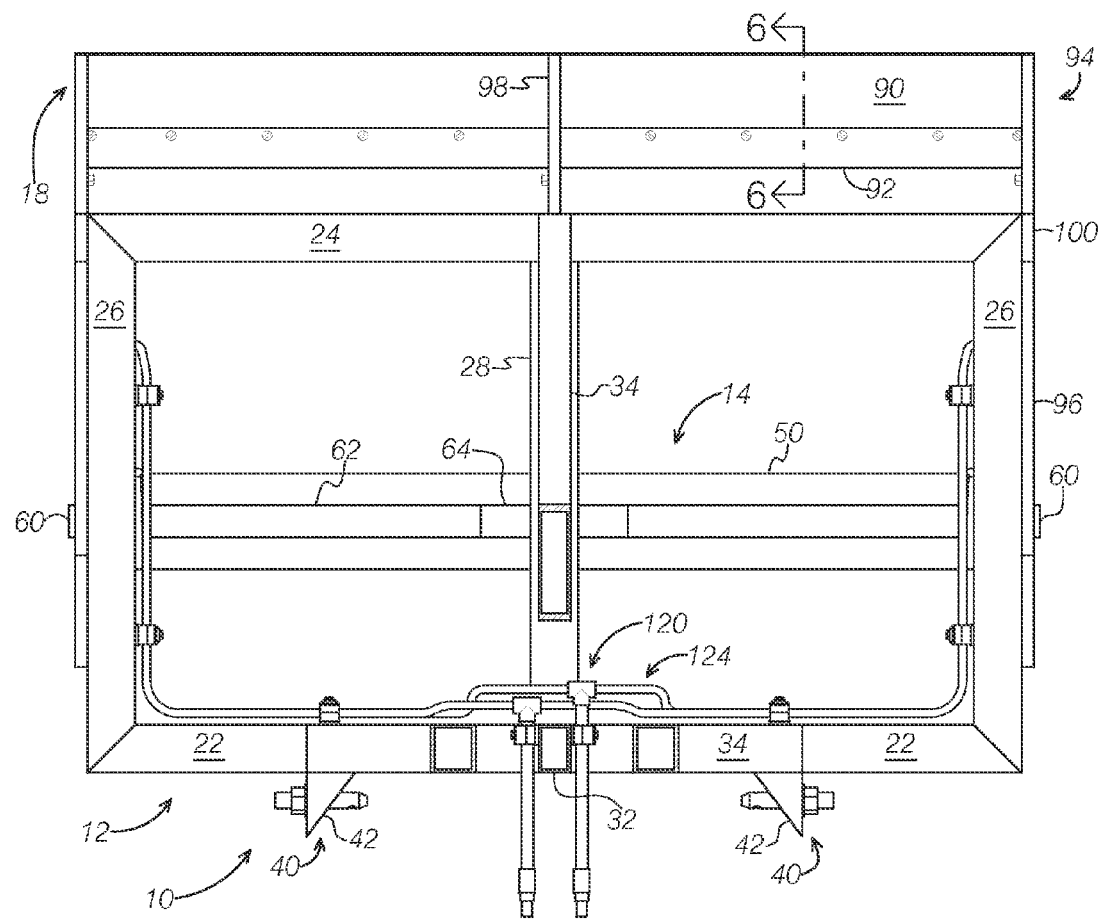

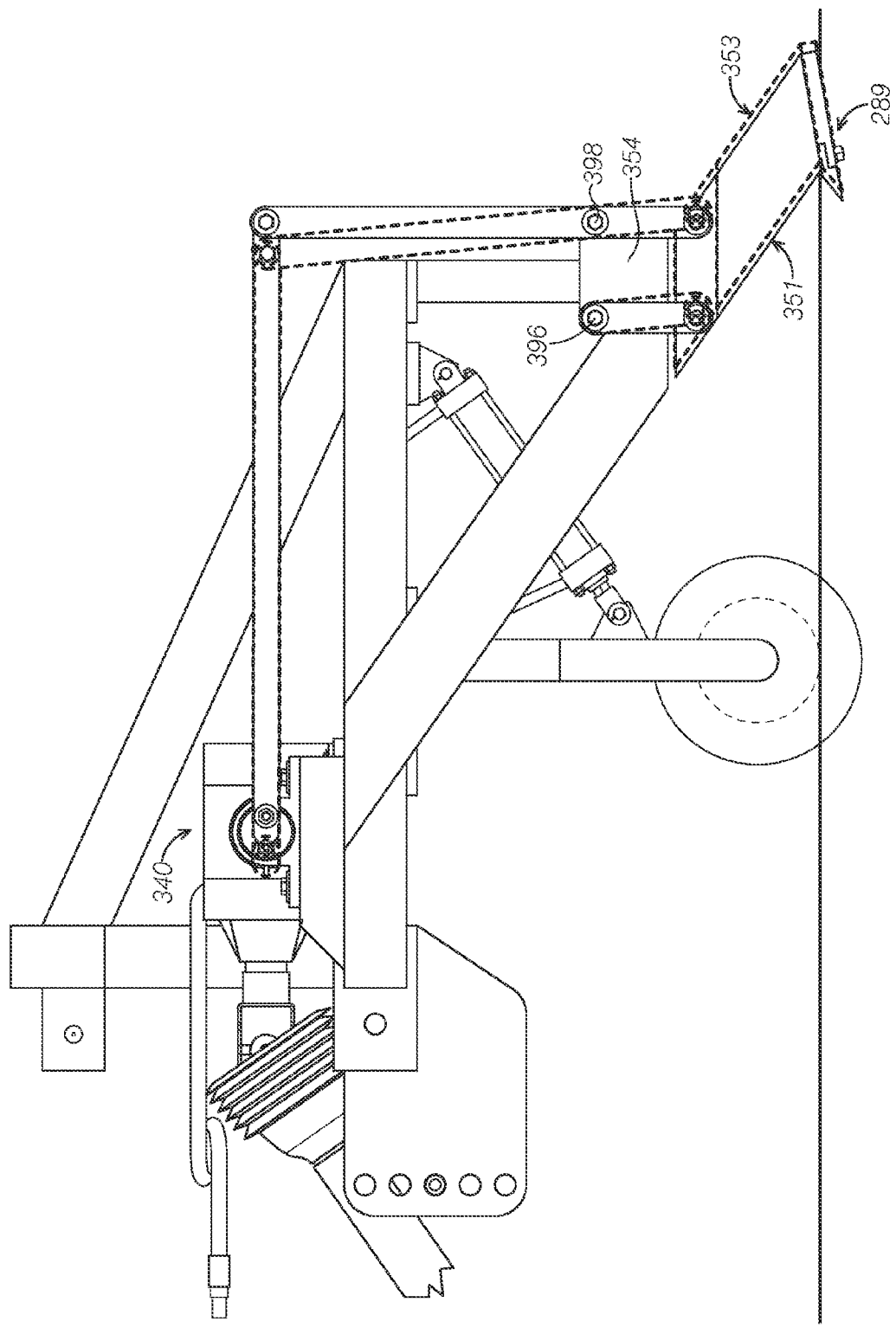

AGRICULTURAL UNDERCUT IMPLEMENTS AND METHODS

TECHNICAL FIELD

This disclosure relates to agricultural implements and, in particular, to agricultural implements and methods for undercutting the ground soil beneath a cover crop, such as to non-terminatingly retard cover crop growth.

BACKGROUND

The use of cover crops has gained popularity in many different agricultural practices in recent years. In general, a cover crop is a crop planted in order to provide benefits for the production of a main crop (sometimes referred to as a "cash crop"), rather than being produced for sale or harvest. Benefits may include management of soil fertility, soil quality, water, weeds, pests, diseases, erosion, and so forth. Cover crops are therefore sometimes referred to as "green manure." Cover crop species encompass many legumes, grasses, other non-legumes, and mixtures thereof, and are typically selected based on a number of factors, including growth pattern, relative vigor (as compared with the main crop, for example), root system characteristics, nitrogen contribution to the soil, the main crop species with which the cover crop is used, and so forth.

Often, cover crops are grown for a specific period, then terminated in order to improve soil fertility and quality for a main crop, such as by contributing biomass to the soil, reducing or eliminating competition for the main crop for nutrients and moisture in the soil, and so forth. A popular method of cover crop termination is by tilling, or plowing under, the cover crop before it is allowed to reach full maturity. In many agricultural practices, the main crop is then planted in the tilled soil.

In some applications, such as in vineyards and orchards, a cover crop is used alongside an existing main crop, such as in the soil between rows of grape vines or trees. In such applications, termination of the cover crop is often timed in order to provide (and/or reduce competition for) nutrients and moisture in the soil, prior to or during one or more growth phases of the main crop, even though the cover crop soil is generally not immediately re-used for planting. Such discontinuous use of the cover crop soil increases erosion concerns during periods in which the soil is bare, such as between termination and replanting.

Although tilling provides additional benefits such as soil aeration, as a method of cover crop termination, tilling involves expending significant resources, such as labor and fuel costs required for multiple passes with a tilling implement in order to sufficiently break down the soil. In addition, tilling may result in loss of a beneficial organic layer, and, in applications in which the main crop is not planted in the same soil, increase erosion during periods when the soil is bare. Tilling also requires what may be a considerable re-seeding cost when replacing or replanting the terminated cover crop. Other methods of cover crop termination, such as flattening and/or crimping with a studded or banded roller, involve similar costs.

SUMMARY

The methods and apparatus disclosed herein may describe various embodiments of an agricultural undercut implement and explain various possible uses in example techniques of cover crop management. In general, the undercut implements disclosed herein may allow control of a permanent cover crop by selectively retarding and/or otherwise limiting its growth, by means of undercutting the ground soil in which the cover crop is planted, and thereafter replacing the undercut soil intact.

In one example embodiment, an agricultural undercut implement includes a frame having ground-engaging rolling means carried thereon, a cutting disk arrangement adapted to cut parallel slits in the ground soil that are aligned with the direction of travel of the frame as the frame rolls over the ground, and an undercut assembly supported on the frame. The undercut assembly includes a number of upright cutting edges each aligned to follow a slit, and a transverse blade having a horizontal cutting edge extending between the bottom ends of the upright cutting edges. The horizontal cutting edge is disposed to undercut the ground soil between parallel slits as frame rolls along the ground, and the transverse blade is inclined upward from the cutting edge to sever the strip of ground soil undercut by the cutting edge, and then move the undercut soil strip up and over the blade before replacing it intact on the ground.

In some embodiments, the implement includes means to couple the frame to a tractor, such as by means of a standard three-point attachment. In such embodiments, the coupling means may enable the tractor to selectively lift the undercut assembly and/or the frame from engagement with the ground, such as by mechanical means.

In some embodiments, the rolling means includes a horizontally transverse ground-engaging roller. In some embodiments, the cutting disk arrangement may include two or more cutting disks. In some embodiments, some or all of the cutting disks may be concentrically mounted with a ground-engaging roller, such as being positioned at either end thereof, and/or mounted on the roller itself at one or more positions interposed between the ends.

Some embodiments may optionally include an undercut depth adjustment system operable to adjust the depth of the transverse blade with respect to the ground surface. In embodiments in which the rolling means includes a horizontally transverse ground-engaging roller, a depth adjustment system may be adapted to raise or lower the roller relative to the frame, which in turn may correspondingly raise or lower the frame and/or undercut assembly relative to the ground surface. Such a system may be implemented in one or more linkages adapted to adjust the relative angle of a pair of roller arms, between which the roller is journaled, with respect to the frame. For example, pivoting the roller arms forward, such as with hydraulic cylinders or other linkages of adjustable length, may decrease the angle of the roller arms relative to the frame, lowering the undercut assembly relative to the ground and increasing the depth at which the cutting edge of the transverse blade undercuts the ground soil. In such embodiments, the upright cutting edges may be adapted to follow and deepen the slits formed by the cutting disks.

An example method of agricultural cover crop management may include one or more of setting the depth of such an undercut implement, and retarding the growth of a cover crop by using the undercut implement to undercut and replace intact the ground soil beneath the cover crop.

The concepts, features, methods, and embodiment configurations briefly described above are clarified with reference to the accompanying drawings and detailed description below.

BRIEF DESCRIPTION OF THE DRAWINGS

FIG. 3 is an elevation view of the roller, the cutting disks, roller arms, and other supporting structure of the undercut implement of FIG. 1.

FIG. 4 is a top view of the undercut implement of FIG. 1, shown in partial cross-section taken along the line 4-4 of FIG. 1.

FIG. 11 is a side elevation view of the example agricultural undercut implement shown in FIG. 7 illustrating a transverse blade assembly of the agricultural undercut implement in a second blade position in phantom lines.

DETAILED DESCRIPTION

Figure 1:
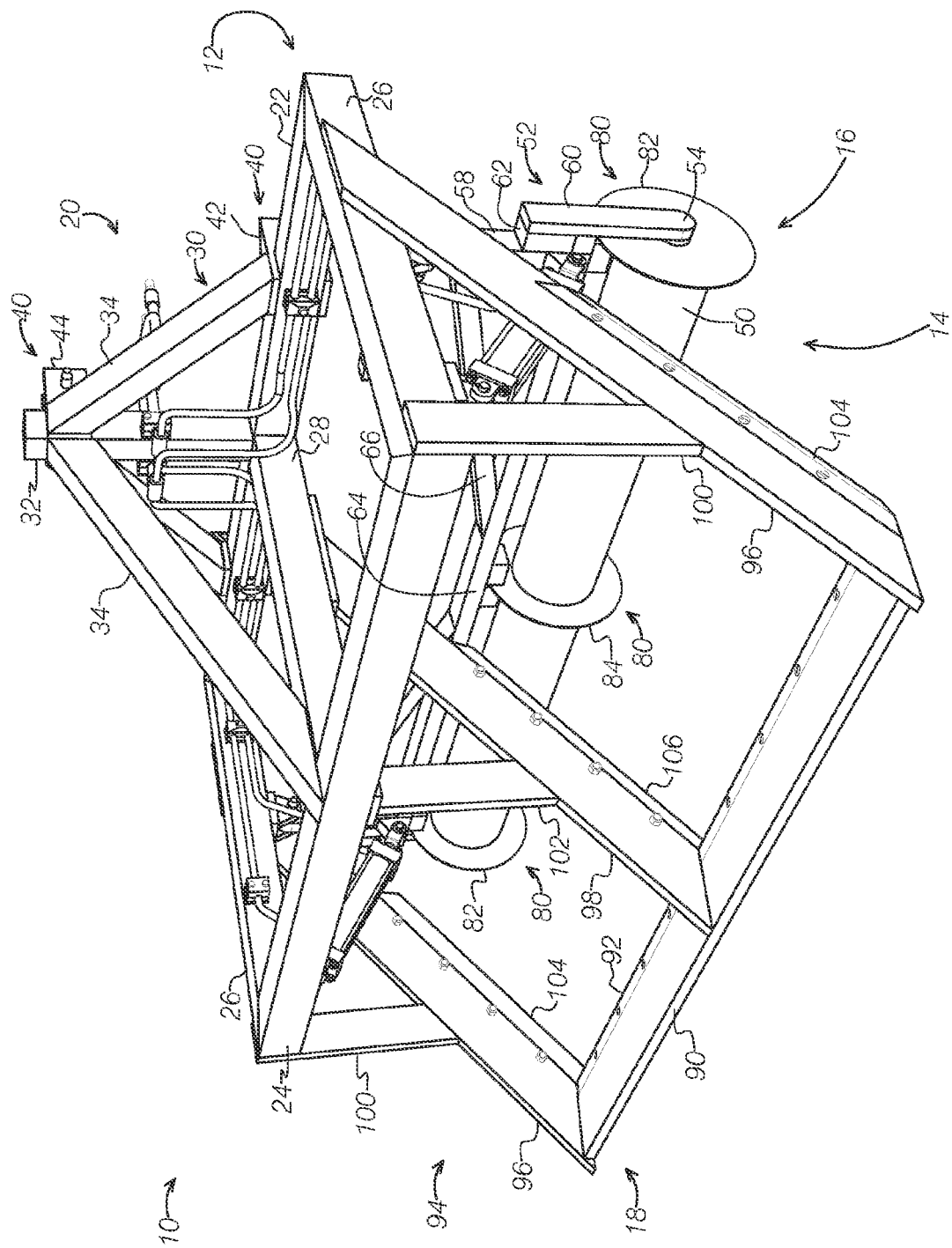
FIG. 1 is a perspective view of an illustrative embodiment of an agricultural undercut implement constructed in accordance with the present disclosure.

An illustrative embodiment of an agricultural undercut implement constructed in accordance with the present disclosure is shown in its entirety in FIG. 1, with FIGS. 2-6 illustrating various structural details and components of the FIG. 1 implement. The illustrative embodiment of the implement is indicated generally at 10 in the drawings, and may be referred to throughout the disclosure as "the implement," although it will be evident that many alternate embodiments, which may employ one or more variations of structure, components, and configuration, are possible without departing from the scope of the disclosure.

In general, the implement 10 includes a frame 12 on which is carried ground-engaging rolling means indicated at 14, a cutting disk arrangement indicated at 16, and an undercut assembly indicated at 18. Although not required to all embodiments, frame 12 is also shown to include coupling means 20 by which the frame may be coupled to, and thereby towed behind, a tractor (not shown), as explained in more detail below.

Frame 12 is shown to be generally rectangular in shape and fabricated out of various bars and frame elements fabricated from a suitably strong and durable structural material such as lengths of steel tubing or otherwise, and that may be interconnected by any suitable means such as by welding, removable fasteners such as bolts, and so forth. In particular, frame 12 is shown to include a relatively long front transverse bar 22, a relatively long rear transverse bar 24, and three short interconnecting bars (opposed side bars 26, and center bar 28) extending between the front and rear bars. Commercial embodiments of implement 10 may be sized, scaled, or otherwise dimensioned for use with tractors of a certain horsepower range, such as between 35 and 80 hp, and/or have a predetermined undercut width, for example that may correspond to standard row spacing between grape vines, trees, etc. For example, a commercial embodiment following the configuration of implement 10 may be adapted to undercut a 60" wide strip of soil, although other ranges and soil strip widths are possible and are considered to be within the scope of this disclosure.

As noted above, frame 12 supports coupling means 20, adapted to couple the frame to a tractor by means of a standard 3-point connection. As such, and as can also be seen with reference to FIG. 2, the coupling means includes mechanical means 40, shown as two side couplers 42 arranged on the front bar 22, and a top coupler 44 disposed on a rise assembly 30, which in turn is shown to consist of a vertical rise 32 supported on the frame by rise supports 34. Couplers 42, 44 are shown as brackets, but in any suitable configuration are adapted to establish mechanical linkages, such as by link pins, bolts, and so forth, with standard corresponding connector structure on the rear end of a tractor. In addition to creating a towing connection, the mechanical linkages are also adapted to allow the tractor to selectively lift and lower the frame 12, such as to engage or disengage the undercut assembly 18 and/or rolling means 14 with the ground, or adjust the cutting depth of the undercut assembly, as explained in greater detail herein.

With additional reference to FIG. 3, rolling means 14 in the illustrative embodiment 10 is shown as a horizontally transverse roller 50, coupled to the side bars 26 by a pair of opposed roller arms 52, between the distal ends 54 of which the roller 50 is rotatably journaled, by means of bearings 56. Roller 50, in commercial embodiments, is fabricated from a length of 6" diameter round tube steel, but may be fabricated from any suitably strong and durable material and in any desired dimension, as will be evident from the description herein. Also, roller 50 is shown to be disposed to roll in the direction in which frame 12 is towed by a tractor. Of course, rolling means in alternate embodiments may consist of one or more rollers, wheels, or some combination of rolling structure, adapted to support the frame relative to the ground and/or establish (or be aligned with) a direction of travel of the frame over the ground.

As shown in greater detail in FIG. 3, the roller arms of the illustrative embodiment include upper portions 58 and lower portions 60 spaced outwardly therefrom by roller arm bar braces 62. In addition to providing support for a roller having a width consistent with that of the frame, such as to maximize the soil strip width and/or the ground surface with which a frame of a certain dimension may accommodate, the illustrated composite roller arm structure may also provide additional structural support for a roller cross bar 64, which extends between the lower portions 60 of the roller arms. Roller cross bar 64 is reinforced by two roller cross bar supports 66. Roller arms 52 are shown to be coupled at their proximal ends 68 to the frame 12 by means of couplers 70. As explained below, in the illustrated embodiment, couplers 70 take the form of clevis fasteners, to allow the roller arms to pivot relative to the frame, but this is not required to all embodiments.

Figure 2:
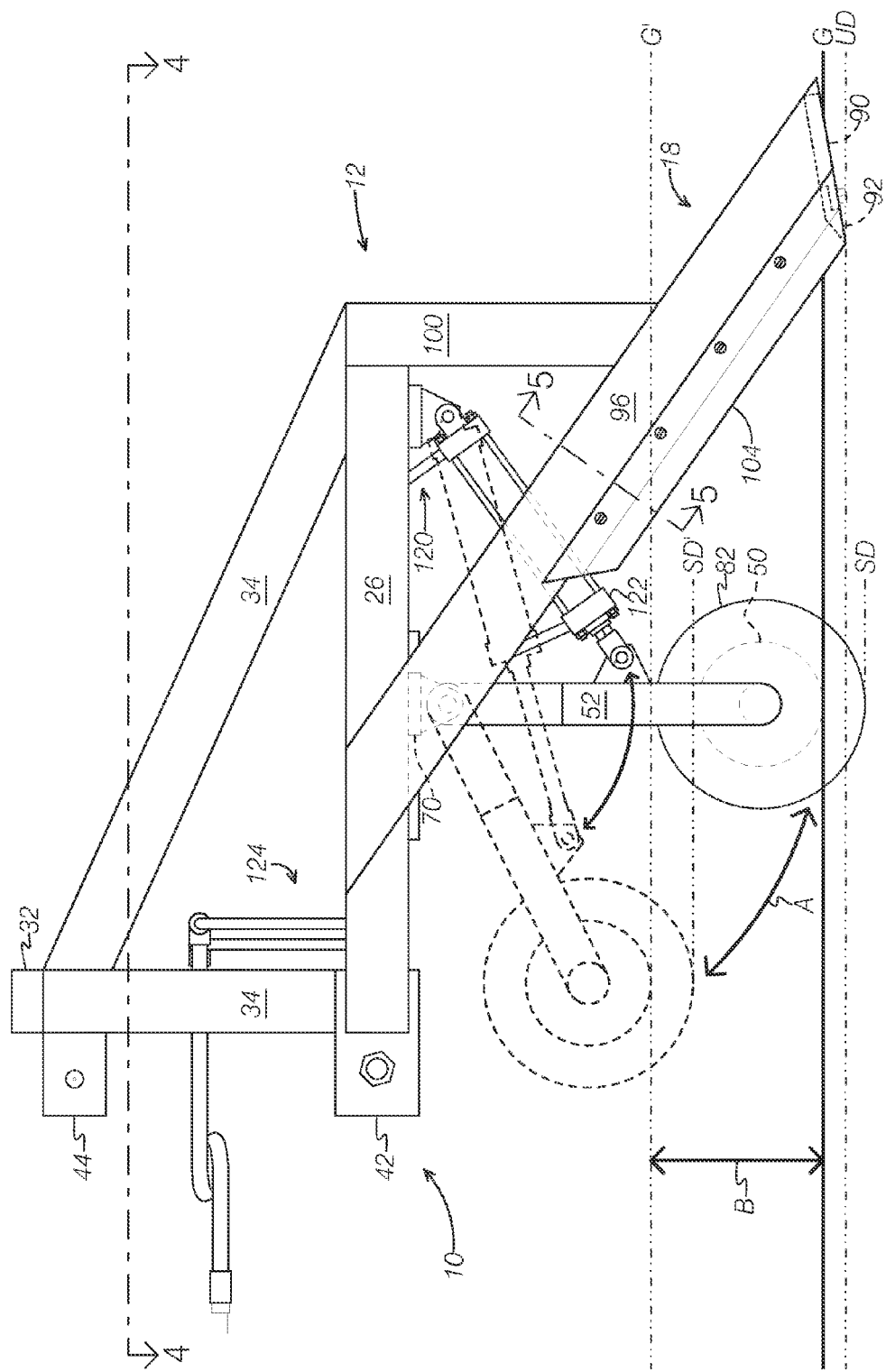
FIG. 2 is a side view of the undercut implement of FIG. 1, and illustrates operation of an example undercut depth adjustment system supported thereon.
Figure 5:
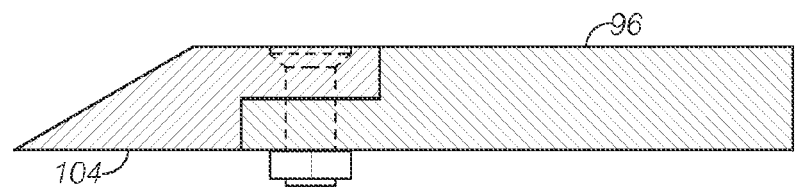
FIG. 5 is a cross-sectional view taken along the line 5-5 of one of the support arms of the undercut implement of FIG. 1, illustrating one manner in which a cutting edge is attached to the support arm.

As shown in FIGS. 1-3, a cutting disk arrangement 16 is supported on the frame 12, and in the illustrated embodiment includes a plurality of coulters or cutting disks 80 adapted to cut parallel, vertical slits in the ground soil S as the frame traverses the ground surface G. Although other configurations are possible and within the scope of this disclosure, in the illustrative embodiment, cutting disks 80 are mounted concentrically with the roller 50. In particular, two side cutting disks 82 are mounted at either end of the roller 50, and a central cutting disk 84 is mounted on the roller interposed between the side cutting disks 82. The peripheral edge of each cutting disk is sharpened or otherwise shaped to enable the disk to exert a substantially downwardly directed cutting action on the ground soil S as the roller 50 rolls over the ground surface G, for example as shown in FIG. 2. As such, in operation, the roller 50 exerts a downward force on the ground surface due to the weight of the frame supported thereby, allowing each cutting disk 80 of the cutting disk arrangement 16 to cut slit in the ground (and any plant matter growing above the ground surface), the depth of which is limited by the extent to which the peripheral edge of the cutting disks project beyond the diameter of the roller. The slit depth is represented in FIG. 2 as SD, and, as explained in greater detail below, is typically set to be greater than the minimum cutting depth of the undercut assembly. Alternate embodiments, such as those fabricated from lighter-weight materials, may include one or more biasing components (not shown) adapted to bias the roller and/or cutting arrangement toward engagement with the ground. As can be seen in FIG. 3, scrapers 72 are disposed on the underside of the roller cross bar, and may function to remove soil and other debris from the peripheral edge and sides of the cutting disks during operation.

Returning to FIGS. 1 and 2, the undercut assembly 18 of the illustrative embodiment of implement 10 is shown to include a transverse blade 90 adapted, by means of a horizontal cutting edge 92, to undercut the ground soil between parallel slits. The transverse blade is supported on the frame by means of a support arm assembly 94, which are shown to include two side support arms 96 and a center support arm 98, each of which depend downward and generally rearward from the frame 12 at an angle, and each of which are reinforced by a corresponding support arm brace 100, 102.

Each support arm is shown to include an upright cutting edge 104, 106 aligned to follow (and, as explained below, deepen) a slit formed by a corresponding cutting disk. The cutting edges thus function to laterally align the undercut assembly 18 with the parallel slits, and may further restrict or prevent the undercut assembly from lateral movement during operation, for example into ground soil that has not been slit. Each cutting edge is shown to extend upward from the bottom of the support arm to an extent slightly greater than the maximum depth to which the cutting edge will be engaged in the ground soil, such as when deepening a slit. Although not required to all embodiments, the cutting edges are shown (for example, in FIG. 5) to be bolted to the support arms, such as to be easily removed for maintenance, sharpening, and/or interchanging (e.g., between the two side arms), such as to even the wear on the cutting edges during prolonged or repeated use. The cutting edges in commercial embodiments are typically constructed from carbide steel, but any suitable strong and/or durable alloy or material may be used.

Although the illustrative embodiment is shown to include three cutting disks and a corresponding number of support arms (and upright cutting edges), alternate embodiments consistent with this disclosure may include any desired number of these components, such as may be appropriate to the dimension of the implement. For example, an implement configured to cover a broader undercut width may include more than three cutting disks (and a corresponding number of support arms), whereas an implement configured for a narrower undercut width may include only two cutting disks, and so forth.

The transverse blade in the illustrative embodiment is shown to extend substantially the width of the frame, such that the bottom ends of side support arms connect to the ends of the transverse blade, with the bottom end of the center support arm connecting to the top surface thereof. However, any suitable arrangement by which a horizontal cutting edge of the transverse blade is disposed to undercut the ground soil between parallel slits is within the scope of the disclosure.

In operation, then, it can be seen that as the frame 12 of the implement 10 traverses the ground, such as when towed behind a tractor, the cutting disks 80 of the cutting disk arrangement 16 form parallel slits in the ground soil as the roller 50 rolls over the ground surface. The undercut assembly 18, which is located rearward of the cutting disk arrangement 16, follows and/or deepens the slits formed by the cutting disks by means of the upright cutting edges 104, 106, and undercuts the ground soil between parallel slits by means of the horizontal cutting edge 92 of the transverse blade 90.

Figure 6:
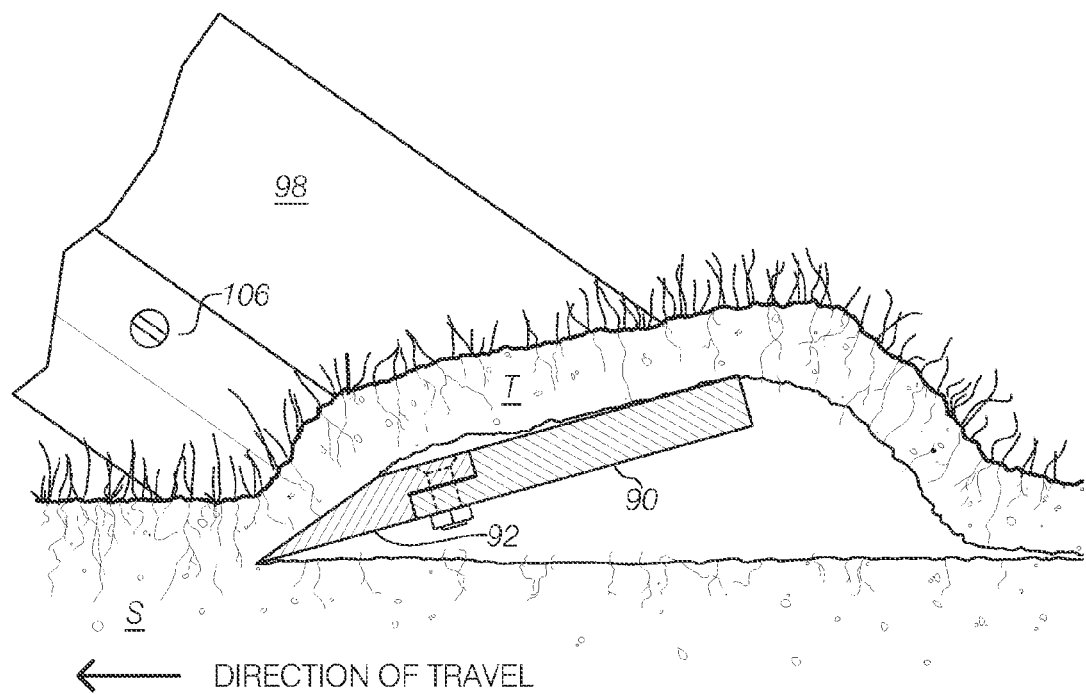
FIG. 6 is a cross-sectional view taken along the line 6-6 of the transverse blade of the undercut implement of FIG. 1, illustrating one manner in which the horizontal cutting edge of the transverse blade undercuts the soil.

FIG. 6 shows a cross-sectional view of the transverse blade and horizontal cutting edge of the implement 10, and more particularly the angle at which the blade and cutting edge engage and move through the ground soil S when the frame traverses the ground. The transverse blade 90 inclines upward from the horizontal cutting edge 92 and is thereby adapted, as the frame 12 traverses the ground and the cutting edge 92 undercuts the ground soil S, to maintain intact and non-removably replace a strip T of undercut ground soil. Maintaining the undercut soil intact may be beneficial in applications in which it is intended, for example, to reduce the vigor of the cover crop planted in the ground soil by retarding (as opposed to terminating) its growth, to maintain the organic soil layer (or layers) created by the root network of the cover crop, to avoid exposing bare soil, to aerate the soil, and so forth.

In some examples, however, disclosed undercut implements may be used to undercut soil to terminate cover crop growth, rather than merely retard its growth. In this context, disclosed undercut implements provide an alternative to using a herbicide to remove cover crop.

The angle of inclination of the top surface of the transverse blade with the ground surface is approximately 10 degrees in commercial embodiments, which has been found to facilitate severing a strip T of undercut ground soil and guiding the strip up and over the top surface of the transverse blade, while maintaining the strip intact. In alternate embodiments, this angle may be increased or decreased, for example as suitable to the application and/or undercut depth. Moreover, as shown, the bias of the cutting edge itself also contributes to the steepness of the undercut. In the illustrative embodiment, the cutting edge is biased at approximately 20 degrees, so that the total angle of the cutting edge to the horizontal is approximately 30 degrees, although the angle of inclination of the top surface of the transverse blade is only approximately 10 degrees. The bias of the cutting edge may be adjusted as suitable for soil conditions, structural integrity or durability, and so forth.

FIG. 6 also illustrates that in the example embodiment 10, horizontal cutting edge 92 is removably secured to transverse blade 90, such as by bolts (as shown) or suitable fasteners.

As noted above, a variety of species of grasses, legumes, non-legumes, and mixtures thereof, may be used as cover crops, and each species may have characteristics that determine, to some extent, timing and other aspects of undercutting, such as when to undercut and how often, undercut depth, and so forth, such as in order to properly manage growth. Such cover crop characteristics may include expected growth pattern, nutrient contribution to, and demand from, the soil, root system growth, and so forth. In a fairly simplified example, a cover crop of ryegrass may require undercutting once per season, for example at or near the beginning of the growth season of the main crop, such as to reduce the vigor of the cover crop in order to reduce competition of the main crop for available soil moisture and nutrients. Undercutting the ryegrass cover crop at a particular depth, for example at 1" to 1½" below the ground surface, may partially sever the cover crop's root system while leaving the root network largely intact, which in turn may retard the growth of the cover crop until it reestablishes its root system in the underlying soil, during which time the main crop may benefit. Other factors, such as soil moisture density, soil composition, and so forth, may similarly be considered in determining an optimum undercut depth.

Thus, although not required to all embodiments, the illustrative embodiment of implement 10 is shown to include an undercut depth adjustment system, designated generally at 120 in FIGS. 2 and 4. The undercut depth adjustment system is operable to adjust the depth of the transverse blade with respect to the ground surface.

Although different manners of undercut depth adjustment are possible, in the illustrative embodiment, the undercut depth adjustment system is implemented by selectively adjusting the vertical position of the roller 50 with respect to the frame 12, by means of pivoting the roller arms 52 on which the roller is supported, relative to the side bars 26. FIGS. 2 and 3 show couplers 70, which couple the proximal ends 68 of the roller arms to the underside of side bars 26, in the form of clevis fasteners, but any manner of pivotable coupling may be used.

FIG. 2 shows an example range of pivoting motion of the roller arms indicated by arrow A, with the roller 50 and cutting disk 82 in solid lines representing a roller orientation corresponding to an example shallowest cutting depth of the transverse blade, and dashed lines representing a roller orientation corresponding to an example deepest cutting depth of the transverse blade. The illustrated range may or may not represent or correspond to a range that may be achieved by a commercial embodiment of the implement, and is shown for clarity of explanation. The example variation in cutting depth UD, which is defined by the horizontal cutting edge of the undercut assembly relative to the ground surface G, is represented in FIG. 2 by means of arrow B. Arrow B shows the change in the level of the ground surface G relative to the frame 12 and undercut assembly 18. In other words, G represents the ground surface relative to the undercut depth UD at the aforementioned shallowest cutting depth, and G' represents the ground surface relative to the undercut depth UD at the aforementioned deepest cutting depth.

In the illustrative embodiment, the roller arms are selectively pivoted relative to the side bars by means of a pair of hydraulic cylinders 122, which function as a mechanical linkage of adjustable length extending between the lower portions 60 of roller arms 52 and a point on the frame, specifically a point rearward of the couplers 70, on the undersides of side bars 26. As shown in FIGS. 1 and 4, the illustrative embodiment of implement 10 supports a hydraulic system generally indicated at 124 and consisting of a suitable arrangement of hoses, fittings, and other components, that is ultimately adapted to couple with a hydraulic system of the tractor by means of coupling means 20. Thus, although a hydraulically-powered undercut depth adjustment system is not required to all embodiments, the illustrated configuration may allow the tractor operator to set the cutting depth of the implement during operation and/or otherwise while the implement is coupled with the tractor, using the tractor's hydraulic system and controls. This functionality may be useful in circumstances in which quick adjustment of the cutting depth may be desired, for example when undercutting rocky soil, and/or in applications in which different cutting depths are suitable for different soil areas, and so forth.

In testing various configurations, it has been found that a depth range of approximately 1" to 5" is suitable for most applications. Although shallower or deeper undercut depths are certainly possible, it has been found that setting the undercut depth at less than 1" sometimes results in the cutting edge skipping across portions of the ground surface without "biting" in, such as in initial engagement with the ground or even during use, such as due to unevenness of the ground surface, rocks or other objects tending to exert upward forces on the transverse blade, and so forth. Operating the undercut depth at more than 5" has been found to increase mechanical fatigue due to increased soil weight passing over the blade, and may increase the possibility of striking larger rocks or other objects that may damage the cutting edge and/or blade, and so forth. Moreover, the root systems and/or rhizospheres of many cover crops do not extend this deep in the soil, reducing the usefulness of the implement in some applications. Notwithstanding these factors, different depth ranges may be achieved by modifying the illustrated configuration while employing the concepts and components disclosed herein, and are therefore considered to be within the scope of this disclosure.

In commercial embodiments following that illustrated in the drawings, the cutting disks are configured to cut a slit depth SD of approximately 1" to 2" deep, such as by using 8" diameter cutting disks mounted concentrically with a 6" diameter roller. As can be seen in FIG. 2, in the shallow undercut depth setting (that is, at undercut depth UD relative to ground surface G), for example an undercut depth of 1", the side and center cutting edges 104, 106 follow the slits formed by the cutting disk arrangement and align the undercut assembly so that strips of ground soil are completely severed.

However, in applications in which an undercut depth greater than the slit depth is selected, for example the deeper undercut depth setting illustrated in FIG. 2 (that is, at undercut depth UD relative to ground surface G'), the cutting edges additionally function to deepen the slits formed by the cutting disk arrangement. At any cutting depth, however, the cutting disks, by employing downward cutting force, are considered to be better suited to forming vertical slits both in the ground surface (and in the plant matter of the cover crop growing thereon) and the ground soil immediately beneath the surface, which is typically fiber-rich (such as with the bulk of the cover crop root system), as compared with the upright cutting edges, which, by applying lateral cutting force to the soil, are considered to be better suited to cutting through fiber-poor matter, such as ground soil lower than the bulk of the cover crop root system. Again, however, the cutting disk arrangement may, in alternate embodiments consistent with this disclosure, be adapted to form slits of a shallower or greater depth than 1" to 2".

An example method utilizing an undercut implement in cover crop management may thus include retarding the growth of a cover crop by using an undercut implement having at least two cutting disks adapted to cut a corresponding number of parallel slits in the ground surface and at least one transverse blade adapted to undercut and replace intact the ground soil between parallel slits as the implement is moved over the ground, to undercut and replace intact the ground soil beneath the cover crop. In an embodiment such as that illustrated herein as implement 10, the method may further include setting the undercut depth of the undercut implement to a desired depth, such as determined by factors including those described above.

With reference to FIGS. 7-11, a second example of an undercut implement, undercut implement 200, will now be described. Undercut implement 200 shares similar or identical features with implement 10 that will not be redundantly explained. Rather, key distinctions between undercut implement 200 and implement 10 will be described in detail and the reader should reference the discussion above for features substantially similar between the implements.

Figure 7:
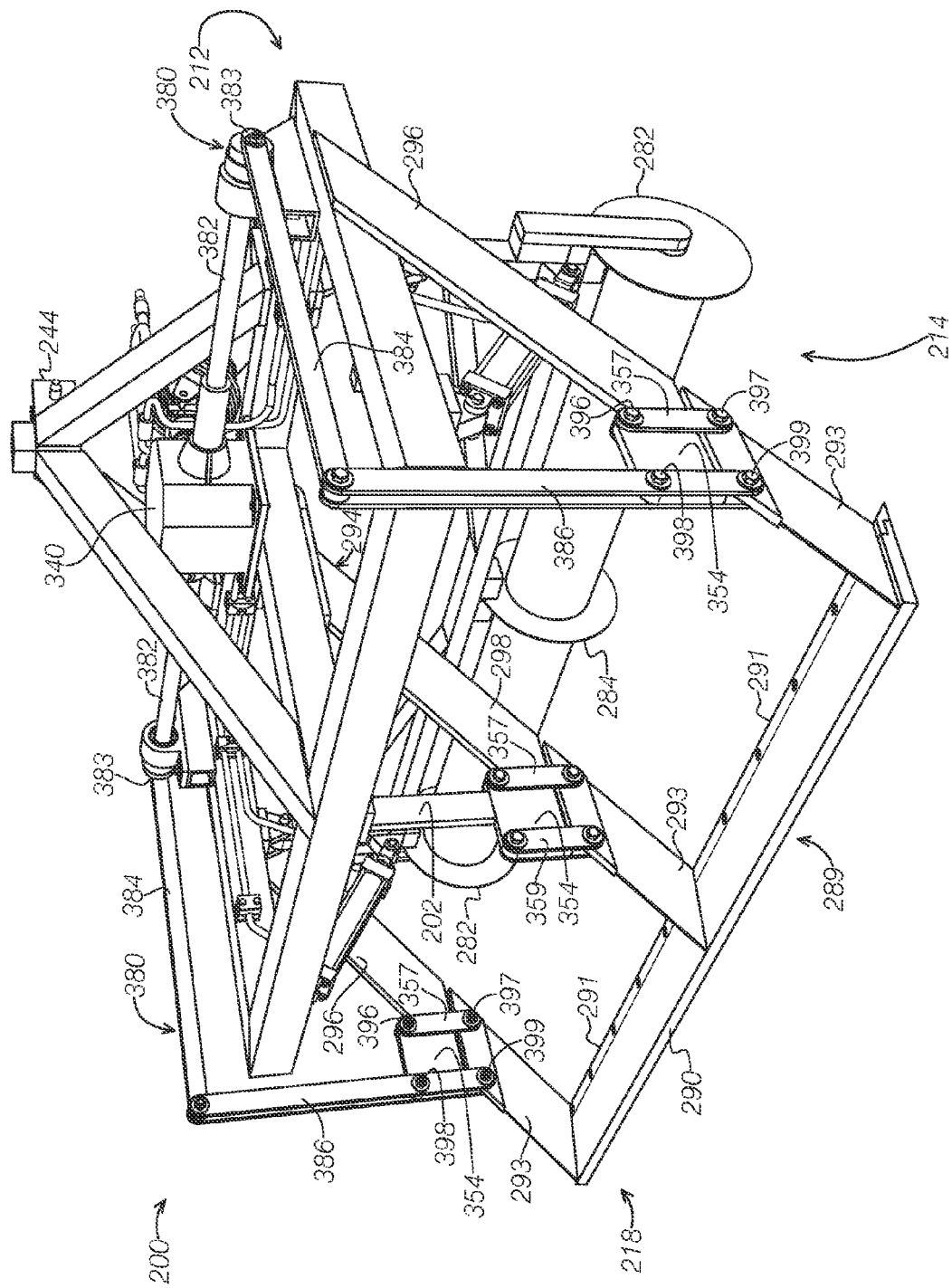
FIG. 7 is a front perspective view of a second example of an agricultural undercut implement constructed in accordance with the present disclosure.

As FIG. 7 illustrates, undercut implement 200 includes a frame 212, a drive unit 340, a rolling means 214, an undercut assembly 218, and a blade driving linkage 380. Undercut implement 200 is configured to, like implement 10, control a permanent cover crop by selectively retarding and/or otherwise limiting its growth. Undercut implement 200 selectively limits the growth of the cover crop by undercutting the ground soil in which the cover crop is planted and thereafter replacing the undercut soil intact.

Unlike implement 10, undercut implement 200 includes mechanical features that reciprocatingly drive and retract a reciprocating transverse blade assembly 289, including the blades of undercut implement 200. Providing undercut implement 200 with one or more reciprocating blades may increase the ability of undercut implement 200 to cut through soil. The benefits provided by these mechanical features may be particularly helpful, for example, in environments with particularly dry or hard soil.

Undercut implement 200 also includes additional or alternative means for connecting to hauling vehicles, such as tractors. The additional or alternative hauling vehicle connecting means provide adequate spacing to connect a power take off ("PTO") shaft between the mechanical features of undercut implement 200 and a hauling vehicle. The connecting means further provide a plurality of attachment points allowing undercut implement 200 to be attached to hauling vehicles at various pitches.

As FIG. 7 shows, frame 212 is similar to frame 12 in several ways. As FIG. 7 shows, frame 212 does not include side support arm braces, similar to support arm braces 100, to partially support transverse blade assembly 289. Undercut implement 200 has a reduced need for such side support arm braces because blade driving linkage 380, not present in implement 10, partially vertically supports transverse blade assembly 289.

Frame 212 does include, however, a central support arm brace 202 substantially similar to support arm brace 102. Some examples may not include central support arm braces, however, because blade driving linkage 380 partially vertically supports transverse blade assembly 289.

Figure 8:
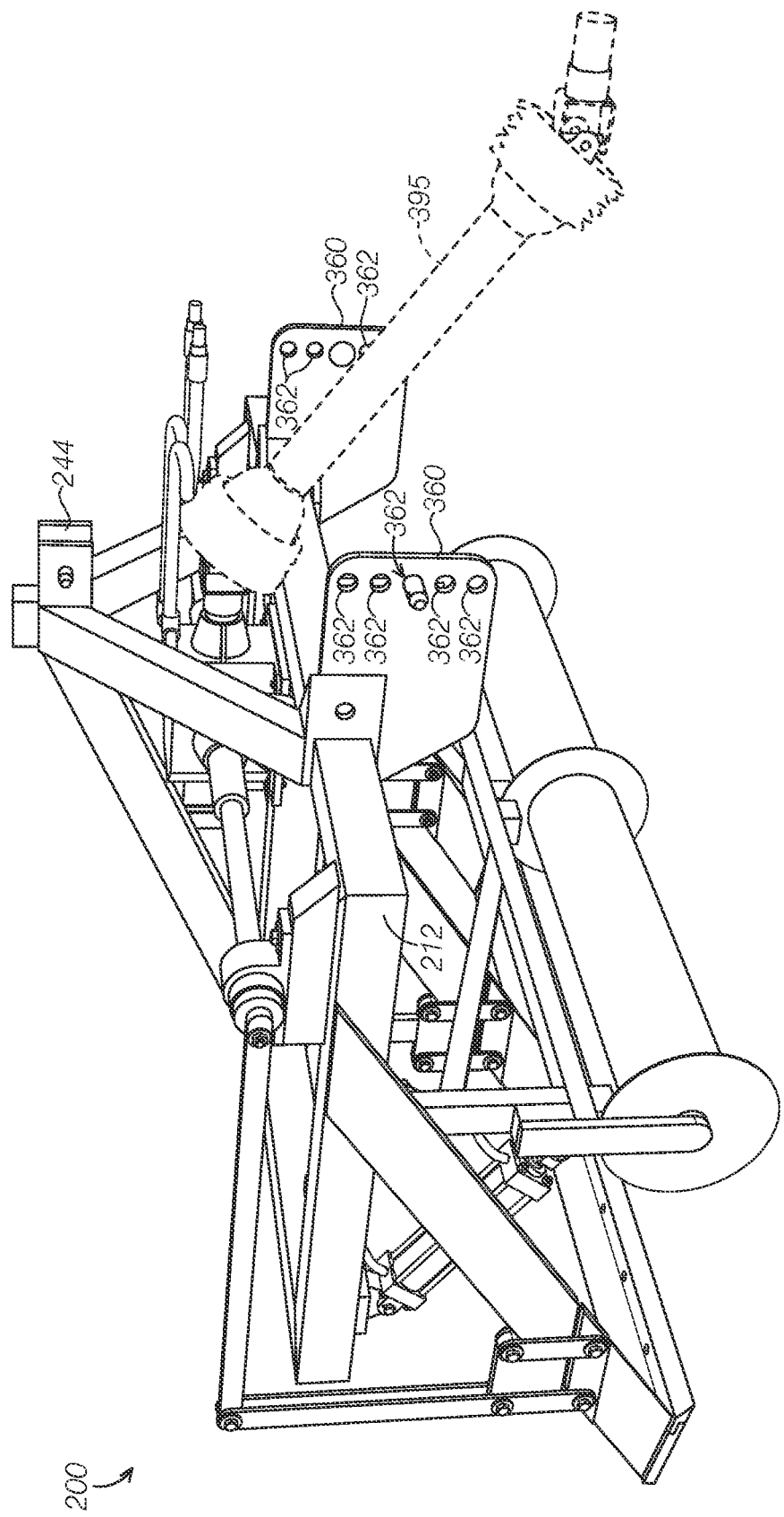
FIG. 8 is a rear perspective view of the example agricultural undercut implement shown in FIG. 7.

As FIG. 8 illustrates, frame 212 includes two lower hitch side couplers 360 positioned on the forward side of frame 212. Lower hitch side couplers 360 allow undercut implement 200 to be attached to a hauling vehicle, such as a tractor, during use. Lower hitch side couplers 360 extend toward the hauling vehicle at a predetermined distance. The predetermined distance is selected to space drive unit 340 from the hauling vehicle a distance sufficient to attach PTO shaft 395, shown in FIGS. 8 and 10, between drive unit 340 and the hauling vehicle's PTO output. Lower hitch side couplers 360 are horizontally spaced to align with the lower arms of a standard tractor three-point hitch.

Figure 9:
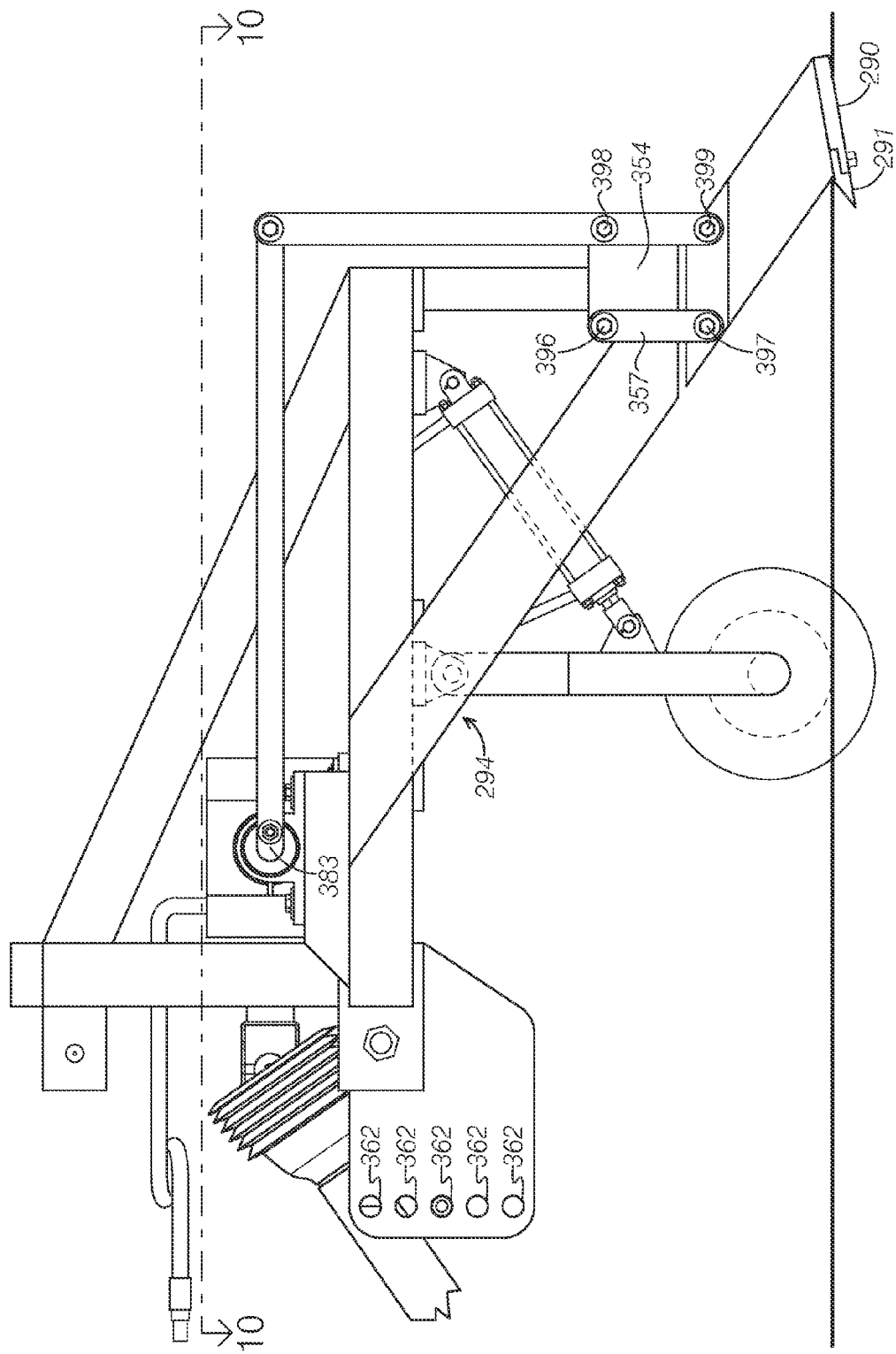
FIG. 9 is a side elevation view of the example agricultural undercut implement shown in FIG. 7.

As FIGS. 8 and 9 show, each lower hitch side coupler 360 includes a plurality of vertically spaced interface openings 362. As FIG. 8 shows, each interface opening 362 is aligned with an opposing interface opening 362 on the opposite lower hitch side coupler 360. Because lower hitch side couplers 360 allow tractor hitches' lower arms to connect to frame 212 at various heights, undercut implement 200 may be adjusted to sit at various pitches when coupled with a hauling tractor. Adjusting undercut implement 200 to sit at various pitches allows undercut implement 200 to easily connect and adjust to different configurations when in operation and removed and stored when non-operational.

As shown in FIG. 8, frame 212 additionally includes a top coupler 244 configured to pair with the upper center arm of a standard tractor three-point hitch.

As FIG. 7 shows, frame 212 carries a ground-engaging rolling means 214. Similar to rolling means 14, rolling means 214 establishes a direction of travel of frame 212 over the ground. As FIG. 7 illustrates, rolling means 214 is substantially similar to rolling means 14, including vertical cutting disks 282 and a central cutting disk 284.

Rolling means 214, like rolling means 14, is adapted to allow the hauling vehicle to selectively lift and lower the frame 212. Selectively lifting and lowering the frame engages and disengages, respectively, the undercut assembly 218 and/or rolling means 214 with the ground. Further, selectively lifting and lowering the frame adjusts the cutting depth of the undercut assembly.

As FIG. 7 illustrates, drive unit 340 is supported on frame 212 and is spaced from transverse blade assembly 289. As FIG. 7 shows, drive unit 340 is positioned on the side of frame 212 proximate a hauling vehicle, such as a tractor. As FIGS. 7 and 8 show, drive unit 340 is configured to pair with a PTO shaft configured to connect to a tractor's PTO output positioned on the rear of the tractor. When so connected, the tractor's PTO output drives the PTO shaft, which drives drive unit 340. Drive unit 340 drives various other mechanical elements.

Frame 212 lacks a vertical column extending between top coupler 244 and the remainder of frame 212 to improve access to drive unit 340. The improved access to drive unit 340 allows drive unit 340 to be connected to a tractor's PTO output with ease.

Drive unit 340 defines a gear box configured to translate power input from a tractor coupled to the gear box via a PTO shaft to drive an attached crankshaft. Undercut implement 200, translates the output of drive unit 340 with blade driving linkage 380 to reciprocatingly adjust transverse blade assembly 289 through a plurality of blade positions. FIG. 11, for example, illustrates drive unit 340 driving transverse blade assembly 289 between a first blade position 351 in solid lines and a second blade position 353 in phantom lines.

Although drive unit 340 defines a gearbox driven by a PTO shaft connected to a tractor's rear PTO output, drive unit 340 may, in some examples, define other types of mechanical actuators configured to drive blade driving linkage 380 and transverse blade assembly 289. In some examples, drive units may be hydraulically or pneumatically powered; in some such examples, hydraulic or pneumatic input may be provided by a hauling vehicle. In other examples, drive units may define independently powered motors, such as electrical motors or combustion engines.

As FIG. 7 illustrates, undercut assembly 218 is supported on frame 212 at a positioned selected to undercut soil at a predetermined pitch. As FIG. 9 shows, undercut assembly 218 includes a support arm assembly 294. As FIG. 7 shows, support arm assembly 294 includes side support arms 296 and central support arm 298.

Similar to the support arms of support arm assembly 94, side support arms 296 and central support arm 298 depend downward and generally rearward from frame 212 at an angle to support undercut assembly 218 on frame 212. As FIG. 7 shows, each support arm includes an upright cutting edge aligned to follow a slit formed by a corresponding one of the cutting disks, substantially similar to side support arms 96 and central support arm 98.

As FIG. 7 illustrates, undercut assembly 218 includes transverse blade assembly 289, which is spaced from and rotatably connected to side support arms 296 and central support arm 298. As FIG. 7 shows, undercut assembly 218 differs from undercut assembly 18. For example, undercut assembly 18 defines a unified body with support arms 96 and central support arm 98. By contrast, undercut assembly 218 spacing is spaced from support arm assembly 294. Further, undercut assembly 218 defines a rotatable four-pivot point connection to support arm assembly 294. The spacing and rotatable connection allow undercut assembly 218 to be driven to rotate around support arm assembly 294.

As FIG. 7 shows, undercut assembly 218 includes three upright members 293 aligned with side support arms 296 and central support arm 298.

As FIG. 7 illustrates, undercut assembly 218 includes transverse blades 290. Transverse blades 290 extend between the lower ends each set of adjacent upright members 293. Each transverse blade 290 has a horizontal cutting edge 291. Similar to transverse blades 90, horizontal cutting edge 291 of each transverse blade 290 is disposed to undercut the ground soil between parallel slits formed by cutting blades bounding the transverse blade. For example, transverse blades may be positioned to undercut soil at a depth range of approximately 1" to 5". A depth range of 1 to 5 inches has been observed to properly cut root systems and/or rhizospheres while avoiding large rocks or other impediments, as previously discussed.

As FIG. 7 shows, side support arms 296 and central support arm 298 each include a support bar 354. Each support bar 354 projects rearwardly from its associated support arm at a location proximate transverse blade assembly 289. Because each support bar 354 projects rewardly from its associated support arm, each support bar 354 is configured to support two horizontally spaced pivot points, as described below.

As FIGS. 7 and 9 illustrate, undercut implement 200 includes three rigid, substantially vertically oriented forward connecting members 357 rotatably connecting transverse blade assembly 289 to support arm assembly 294. As FIG. 9 shows, each forward connecting member 357 is pivotally connected to an associated support bar 354 at a first pivot point 396 and transverse blade assembly 289 at a second pivot point 397.

Figure 10:
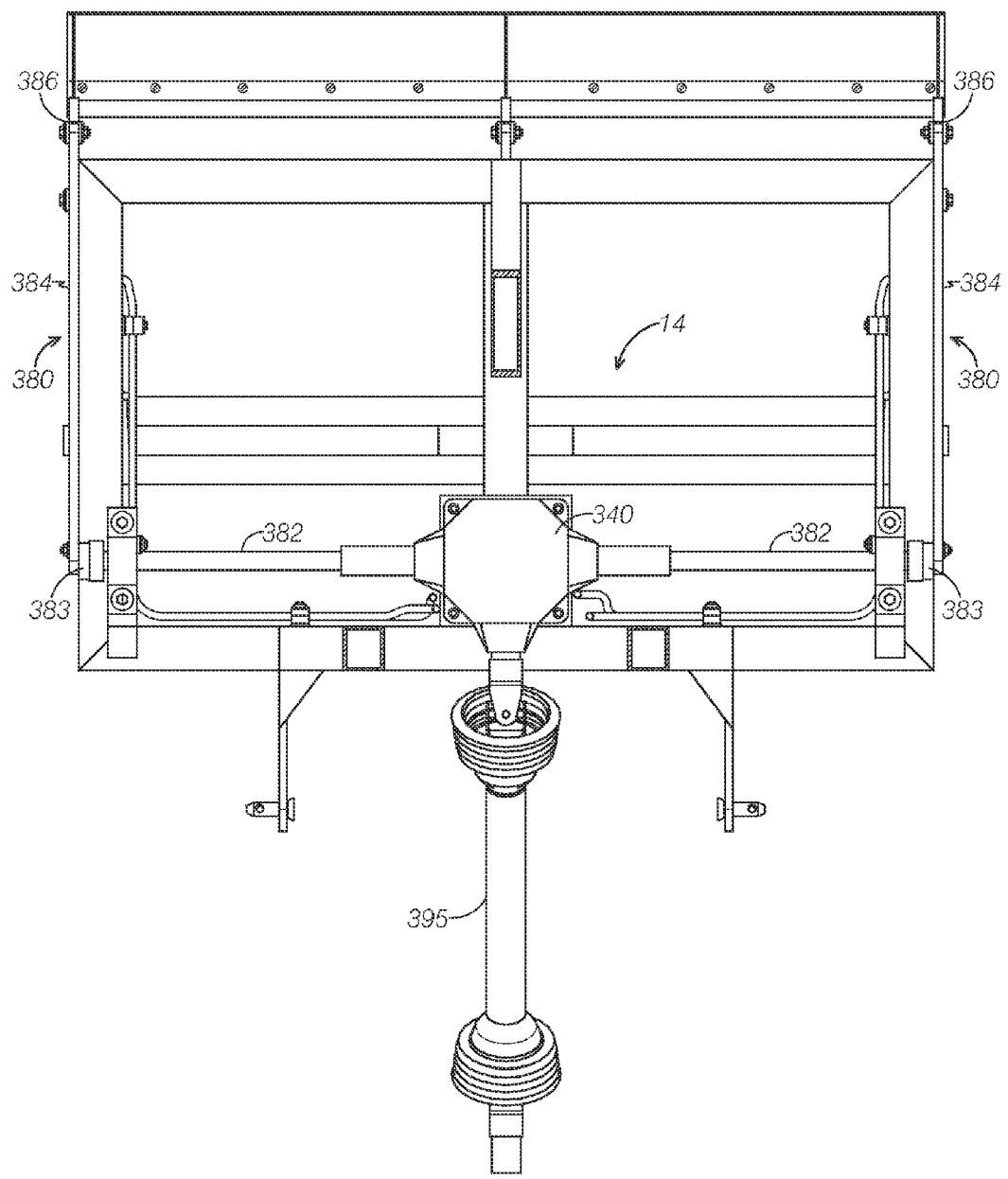
FIG. 10 is a top view of the example agricultural undercut implement shown in FIG. 7, shown in partial cross-section taken along the line 4-4 of FIG. 9.

As FIG. 7 shows, blade driving linkage 380 is drivingly connected to drive unit 340 and transverse blade assembly 289 to translate the output of drive unit 340 to reciprocatingly drive and retract transverse blade assembly 289 through a plurality of blade positions. As FIGS. 7 and 10 show, blade driving linkage 380 includes, on each lateral side of undercut implement 200, a crankshaft 382, a connecting rod 384, and a rear support member 386. By continuously driving transverse blade assembly 289 through various blade positions, drive unit 340 and blade driving linkage 380 drive transverse blade assembly 289 forward and backward in a reciprocating fashion to increase the effectiveness of transverse blade assembly 289 in undercutting soil. The reciprocating action of undercut implement 200 improves the ability of its blades to cut through soil, which may be particularly useful when cutting dry or other hard soil.

As FIGS. 7, 9, and 10 illustrate, each crankshaft 382 extends laterally from drive unit 340 to a crank 383 substantially aligned with a corresponding side support arm 296. Each crankshaft 382 and corresponding crank 383 are configured to cooperatively translate energy output by drive unit 340 to drive blade driving linkage 380 and, by extension, transverse blade assembly 289. Specifically, drive unit 340 is configured to translate power input from a power source, such as a PTO shaft connected to drive unit 340, to continuously rotationally drive each crankshaft 382.

As FIG. 7 shows, connecting rod 384 is pivotally connected to crank 383. Connecting rod 384 additionally extends horizontally in a direction transverse to crankshaft 382. Because connecting rod 384 is pivotally connected to crank 383, crank 383 drives connecting rod 384 in a reciprocating fashion. Further, because connecting rod 384 extends horizontally and transverse to crankshaft 382, drive unit 340 drives connecting rod 384 horizontally forward and back when rotating crankshaft 382 and crank 383.

A FIG. 7 shows, each rear support member 386 is fixedly connected to the corresponding connecting rod 384. Because each rear support member 386 is fixedly connected to an associated connecting rod 384, the connecting rod 384 reciprocatingly pushes and pulls rear support member 386 when driven by drive unit 340.

As FIG. 7 additionally illustrates, each rear support member 386 is extends vertically to connect with transverse blade assembly 289 on an end distal connecting rod 384. Because rear support member 386 is connected to connecting rod 384 and transverse blade assembly 289, rear support member 386 translates the pushing and pulling motion of connecting rod 384 to transverse blade assembly 289.

As FIG. 11 illustrates, rear support member 386 is pivotally connected, at a rear support member pivot point located between the top and bottom of rear support member 386, to support bar 354 at a third pivot point 398. Support bar 354 is substantially rigid and is configured to support third pivot point 398 at a substantially fixed horizontal and vertical position. Because support bar 354 is configured to retain rear support member 386 in a substantially fixed vertical and horizontal position, rear support member 386 pivots around third pivot point 398 as connecting rod 384 pushes and pulls rear support member 386.

As FIG. 11 illustrates, rear support member 386 is pivotally connected to transverse blade assembly 289 at a fourth pivot point 399. As FIG. 11 shows, this allows each rear support member 386 to translate motion produced by drive unit 340 to transverse blade assembly 289 while allowing transverse blade assembly 289 to pivot relative rear support member 386.

As FIG. 7 shows, blade driving linkage 380 does not connect to transverse blade assembly 289 proximate its center. As FIG. 7 shows, a rear connecting member 359, substantially similar to forward connecting members 357, connects the associated support bar 354 to transverse blade assembly 289. As FIG. 7 shows, rear connecting member 359 connects to the associated support bar 354 at a third pivot point 398 and to transverse blade assembly 289 at a fourth pivot point 399. Third pivot point 398 and fourth pivot point 399 are substantially aligned with the third and fourth pivots associated with each of the side support arms. Connecting transverse blade assembly 289 to central support arm 298 may not be necessary in all examples, and some examples may lack any connection between transverse blade assembly 289 and central support arm 298.

As FIG. 11 shows, blade driving linkage 380 and support arm assembly 294 are configured to attach transverse blade assembly 289 in a four pivot point configuration. As FIG. 11 shows, the four pivot point configuration includes four pivotal points of attachment at each of the three support arm and blade assembly junctions. As FIG. 11 shows, the four pivot point configuration retains transverse blade assembly 289 in a proper position to undercut soil as rear support member 386 reciprocatingly drives and retracts transverse blade assembly 289.

For example, the four pivot point configuration rotatably connects transverse blade assembly 289 to frame 212 at two fixed axes of rotation, first pivot point 396 and third pivot point 398. As FIG. 11 shows, first pivot point 396 and third pivot point 398 are spaced from one another. Because first pivot point 396 and third pivot point 398 are spaced from one another, the connection between transverse blade assembly 289 and frame 212 causes rear support member 386 to drive transverse blade assembly 289 through an elliptical path that effectively approximates linear motion. Approximating linear motion means that the angle of transverse blade assembly 289 relative the ground remains consistently within a range suitable for undercutting soil. As a result, transverse blade assembly 289 effectively directs the blade driving linkage linearly from a first blade position to a second blade position in response to the drive unit driving the blade driving linkage.

For example, FIG. 11 shows transverse blade assembly 289 reciprocating substantially linearly between first blade position 351 and second blade position 353. In particular, each forward connecting member 357 retains transverse blade assembly 289 at a substantially fixed distance from first pivot point 396, which thereby restricts transverse blade assembly 289 from improperly rotating around fourth pivot point 399 and away from frame 212 in response to rear support member 386 driving transverse blade assembly 289. As a result, drive unit 340 repeatedly drives and retracts transverse blade assembly 289 without improperly adjusting the angle of transverse blades 290 relative the ground. Because the angle of transverse blades 290 is not improperly adjusted when driven by drive unit 340, transverse blades 290 remain in proper position while getting the mechanical benefit provided by drive unit 340.

Although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. An agricultural undercut implement, comprising:
    a frame having ground-engaging rolling means carried thereon, the rolling means establishing a direction of travel of the frame over the ground;
    a drive unit;
    an undercut assembly supported on the frame and having:
        at least one transverse blade, the transverse blade having a horizontal cutting edge being disposed to undercut ground soil between parallel slits, the transverse blade rotatably connected to the frame;
        a blade driving linkage including a substantially vertically oriented rear support member operationally connected to the drive unit on a first end and pivotally connected to the transverse blade on a second end;
        at least two support arms, each support arm depending downward and generally rearward from the frame;
        a rigid support bar projecting horizontally rearward from the support arm; and
        a connecting member pivotally connected to the transverse blade and pivotally connected to the support arm;
    wherein:
        the drive unit is configured to drive the blade driving linkage to adjust the transverse blade through a plurality of blade positions in response to the drive unit driving the blade driving linkage; and
        the transverse blade, in at least one of the blade positions, inclines upward from the cutting edge thereof and is thereby adapted, as the frame traverses the ground, to move a strip of ground soil undercut by the cutting edge up and over the transverse blade before being replaced intact on the ground;
        the rear support member is pivotally connected, at a rear support member pivot point located between the first end of the rear support member and the second end of the rear support member, to the rigid support bar at a fixed pivot point, the fixed pivot point being spaced from the support arm; and
        the blade driving linkage is configured to reciprocatingly push and pull the first end of the rear support member in response to the drive unit driving the blade driving linkage.

2. The implement of claim 1, wherein the transverse blade is rotatably connected to the frame at two fixed axes of rotation elliptically directing the transverse blade, when driven by the blade driving linkage, to remain at an angle relative the ground consistently within a range suitable for undercutting soil.

3. The implement of claim 1, further comprising coupling means to couple the frame to a tractor, the coupling means including a mechanical linkage whereby the frame may be moved along the ground by the tractor.

4. The implement of claim 3, wherein the mechanical linkage is operable to allow the undercut assembly to be selectively lifted, by the tractor, from engagement with the ground.

5. The implement of claim 3, wherein the coupling means further includes a hydraulic linkage.

6. The implement of claim 5, further comprising an undercut depth adjustment system hydraulically powered by the hydraulic linkage and operable to adjust the depth of the transverse blade with respect to the ground surface.

7. The implement of claim 3, wherein the coupling means is adapted to couple the frame to the rear of the tractor by means of a standard three-point attachment.

8. The implement of claim 1, wherein the rolling means includes a horizontally transverse roller configured to support the frame relative to the ground.

9. The implement of claim 8, further comprising at least two vertical cutting disks adapted to cut parallel slits aligned with the direction of travel in the ground soil as the frame traverses the ground.

10. The implement of claim 9, wherein the at least two vertical cutting disks are concentrically mounted with the roller.

11. The implement of claim 10, wherein the at least two vertical cutting disks includes two cutting disks mounted at either end of the roller.

12. The implement of claim 11, wherein the at least two vertical cutting disks further includes a third cutting disk mounted on the roller interposed between the two cutting disks mounted at either end of the roller.

13. The implement of claim 1, further comprising at least two vertical cutting disks adapted to cut parallel slits aligned with the direction of travel in the ground soil as the frame traverses the ground.

14. The implement of claim 1, further comprising an undercut depth adjustment system operable to adjust the depth of the transverse blade with respect to the ground surface.

15. The implement of claim 14, wherein:
   the rolling means includes a horizontally transverse roller configured to support the frame relative to the ground;
   the roller is journaled between the distal ends of two roller arms extending generally upward from the roller and pivotally mounted to the frame at the proximal ends thereof;
   the undercut depth adjustment system is adapted to selectively pivot the roller arms relative to the frame; and
   pivoting the roller arms relative to the frame adjusts the depth of the transverse blade with respect to the ground surface.

16. The implement of claim 15, wherein the undercut depth adjustment system includes at least one roller linkage of adjustable length extending between a roller arm and a point on the frame rearward of the roller arm, wherein the length of the roller linkage determines the depth of the transverse blade with respect to the ground surface.

17. The implement of claim 14, wherein the undercut depth adjustment system allows the cutting depth of the transverse blade with respect to the ground surface to be set in a range of approximately 1" to 5".

\* \* \* \* \*